United States Patent
Chou et al.

(10) Patent No.: US 6,836,041 B2
(45) Date of Patent: Dec. 28, 2004

(54) BEARING DEVICE FOR A MOTOR HAVING A BEARING SET INCLUDING MULTIPLE BEARINGS OF DIFFERENT MATERIALS

(75) Inventors: Yu-Cheng Chou, Tu-Chen (TW); Chin-Hung Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 71 days.

(21) Appl. No.: 10/299,538

(22) Filed: Nov. 18, 2002

(65) Prior Publication Data

US 2004/0007927 A1 Jan. 15, 2004

(30) Foreign Application Priority Data

Jul. 10, 2002 (TW) ...................... 91210511 U

(51) Int. Cl.[7] .................. H02K 5/16; H02K 7/08; H02K 7/09; F16C 17/02; F18C 32/06
(52) U.S. Cl. .................. 310/90; 384/114; 384/279
(58) Field of Search ................ 384/114, 129, 384/276, 295, 297, 902, 907.1, 910, 279, 126; 310/90

(56) References Cited

U.S. PATENT DOCUMENTS

| | | | | |
|---|---|---|---|---|
| 4,329,606 A | * | 5/1982 | Montagu ............... | 310/71 |
| 4,330,725 A | * | 5/1982 | Hintz ................. | 310/82 |
| 4,857,785 A | * | 8/1989 | McCarty .............. | 310/78 |
| 5,019,738 A | * | 5/1991 | Weilbach et al. ....... | 310/90.5 |
| 5,142,173 A | * | 8/1992 | Konno et al. .......... | 310/67 R |
| 5,270,600 A | * | 12/1993 | Hashimoto ............ | 310/75 D |
| 5,280,208 A | * | 1/1994 | Komura et al. ........ | 310/90 |
| 5,357,163 A | * | 10/1994 | Minakuchi et al. ..... | 310/90 |
| 5,675,201 A | * | 10/1997 | Komura et al. ........ | 310/90.5 |
| 5,895,119 A | * | 4/1999 | Miyasaka et al. ...... | 384/279 |
| 5,896,242 A | * | 4/1999 | Albrecht et al. ....... | 360/99.08 |
| 5,941,646 A | * | 8/1999 | Mori et al. ........... | 384/279 |
| 5,994,803 A | * | 11/1999 | Jung ................. | 310/51 |
| 6,107,717 A | * | 8/2000 | Lin et al. ............ | 310/90 |
| 6,119,346 A | * | 9/2000 | Miyasaka et al. ...... | 29/898.02 |
| 6,244,749 B1 | * | 6/2001 | Nakagawa et al. ..... | 384/114 |
| 6,310,415 B1 | * | 10/2001 | Horng ................ | 310/90 |
| 6,318,976 B1 | * | 11/2001 | Hsieh ................ | 417/423.12 |
| 6,340,854 B1 | * | 1/2002 | Jeong ................ | 310/90 |
| 6,437,464 B1 | * | 8/2002 | Neal ................. | 310/43 |
| 6,498,412 B2 | * | 12/2002 | Horng ................ | 310/91 |
| 6,501,616 B1 | * | 12/2002 | Neal ................. | 360/99.08 |
| 6,614,139 B2 | * | 9/2003 | Saichi et al. ......... | 310/90 |
| 6,617,721 B1 | * | 9/2003 | Neal ................. | 310/68 D |
| 6,707,199 B2 | * | 3/2004 | Chang et al. ......... | 310/90 |
| 6,769,808 B2 | * | 8/2004 | Shih et al. ........... | 384/114 |

FOREIGN PATENT DOCUMENTS

| | | | | |
|---|---|---|---|---|
| EP | 1170519 A2 | * | 1/2002 | ......... F16C/19/18 |
| JP | 63152721 A | * | 6/1988 | ......... F16C/33/10 |
| JP | 03164042 A | * | 7/1991 | ......... H02K/5/167 |

* cited by examiner

Primary Examiner—Karl Tamai
Assistant Examiner—Pedro Cuevas
(74) Attorney, Agent, or Firm—Wei Te Chung

(57) ABSTRACT

A bearing device (10) for a motor (12) includes a bearing set (20) and a shaft (14). The bearing set includes first and second bearings (21, 26), which are made of sintered metallic material and ceramic material respectively. An annular recess (24) is defined in one end of the first bearing. The second bearing is received in the recess. Each bearing defines a central hole (22, 27). The central holes have a same diameter. The motor includes a rotor (30), a stator (32), and a bearing sleeve (34). In assembly, one end of the shaft is fixed in a center of the rotor. The second bearing is inserted into the recess. The bearing set is fixed within the bearing sleeve. The stator is fixed around the bearing sleeve. The shaft is rotatably received in the central holes. During operation, the shaft rotates smoothly and stably in the bearing set.

5 Claims, 7 Drawing Sheets

BEARING DEVICE FOR A MOTOR HAVING A BEARING SET INCLUDING MULTIPLE BEARINGS OF DIFFERENT MATERIALS

BACKGROUND OF THE INVENTION

1. Field of the Invention

The present invention relates to a bearing device for motors and, in particular, a bearing device comprising a plurality of bearings made of different materials.

2. Description of the Prior Art

A bearing for a fan motor is usually fixed in a stator. A shaft attached to a rotor is rotatably received in the bearing. In earlier days, a ball bearing was the preferred kind of bearing. However, ball bearings are noisy and relatively expensive. To overcome these shortcomings, a kind of self-lubricating bearing made of metallic material has been developed. As shown in FIG. 7, a conventional motor 1 includes a rotor 2, a shaft 3, a self-lubricating bearing 4, a bearing sleeve 5, a stator 6 and a locking fastener 7. The stator 6 is fixed around the bearing sleeve 5. The self-lubricating bearing 4 is tightly fixed within the bearing sleeve 5. One end of the shaft 3 is fixed in a center of the rotor 2, and the other end accommodates the locking fastener 7. The shaft 3 is rotatably received in a central hole 8 of the bearing 4. However, the bearing 4 has low durability. To overcome this shortcoming, a kind of ceramic material bearing has been developed. However, the ceramic material bearing cannot self-lubricate.

SUMMARY OF THE INVENTION

Accordingly, an object of the present invention is to provide a self-lubricating bearing device which is durable and not noisy.

To achieve the above-mentioned object, a bearing device of the present invention used in a motor includes a bearing set and a shaft. A preferred embodiment of the bearing set comprises a first bearing and a second bearing. The first and second bearings are made of different materials. In the preferred embodiment, the materials are sintered metallic material and ceramic material respectively. An annular recess is defined in one end of the first bearing. The second bearing is received in the recess of the first bearing. Each bearing defines a central hole. The central holes of the first and second bearings have a same diameter. A guiding head is formed at one end of the shaft. The motor comprises a rotor, a stator, and a bearing sleeve. In assembly, one end of the shaft is fixed in a center of the rotor. The second bearing is inserted into the recess of the first bearing. The bearing set is fixed within the bearing sleeve. The stator is fixed around the bearing sleeve. The shaft is rotatably received in the central holes of the bearings. During operation, the shaft rotates smoothly and stably in the bearing set.

Other objects, advantages and novel features of the present invention will become more apparent from the following detailed description when taken in conjunction with the accompanying drawings, in which:

DETAILED DESCRIPTION OF THE INVENTION

Figure 1:
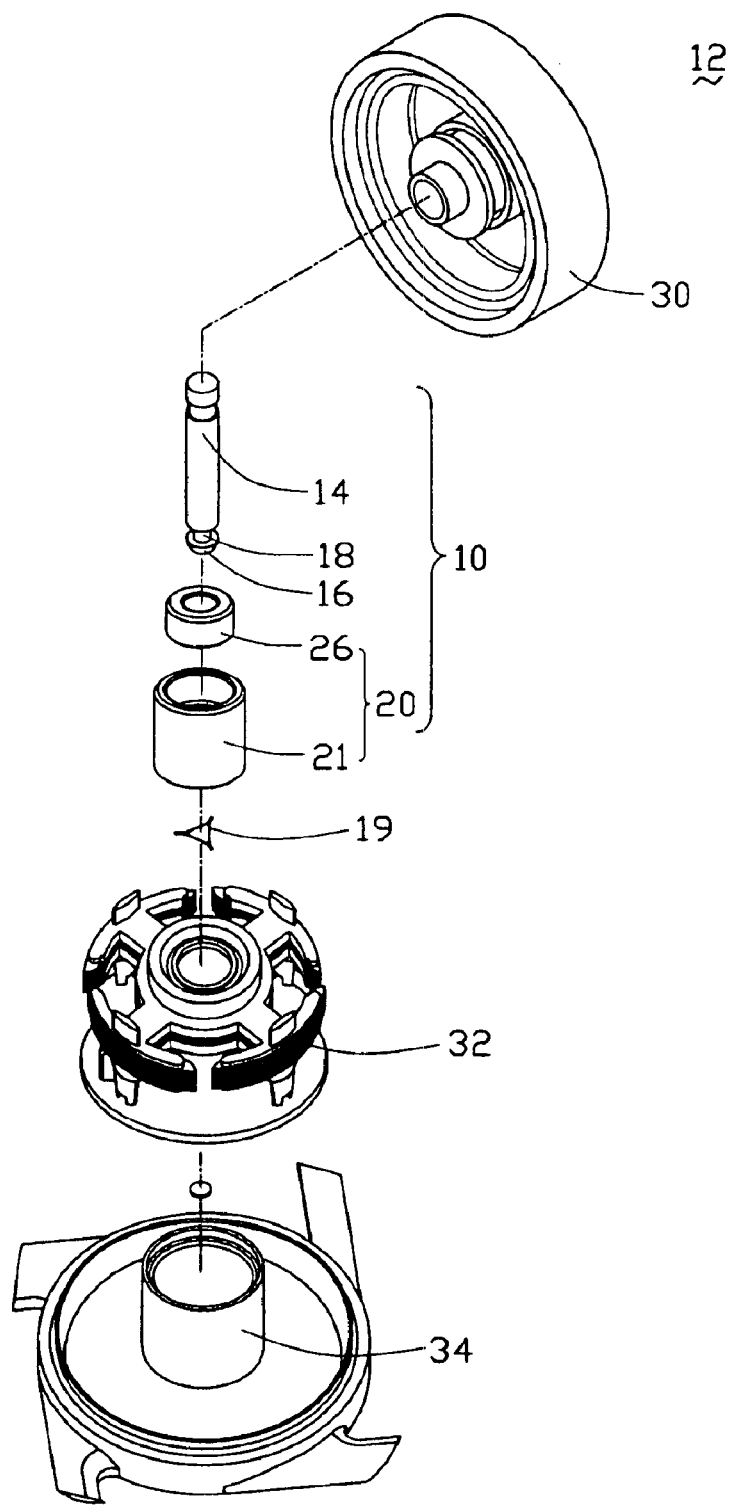
FIG. 1 is an exploded isometric view of a motor including a bearing device in accordance with a first preferred embodiment of the present invention.
Figure 2:
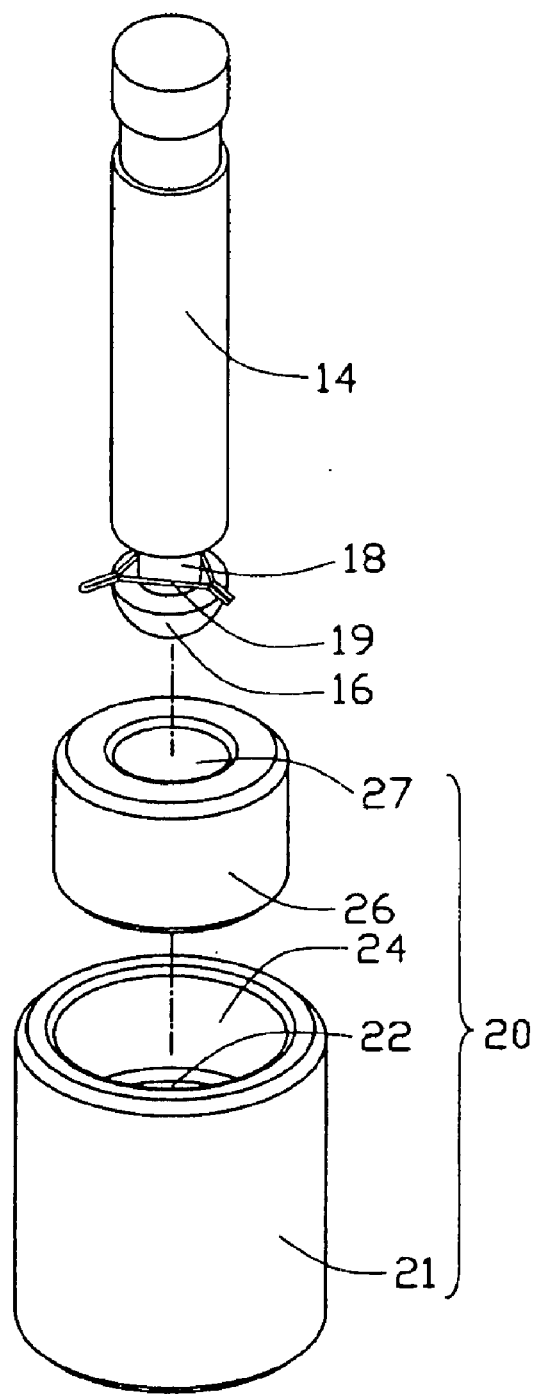
FIG. 2 is an enlarged exploded isometric view of the bearing device of FIG. 1.
Figure 3:
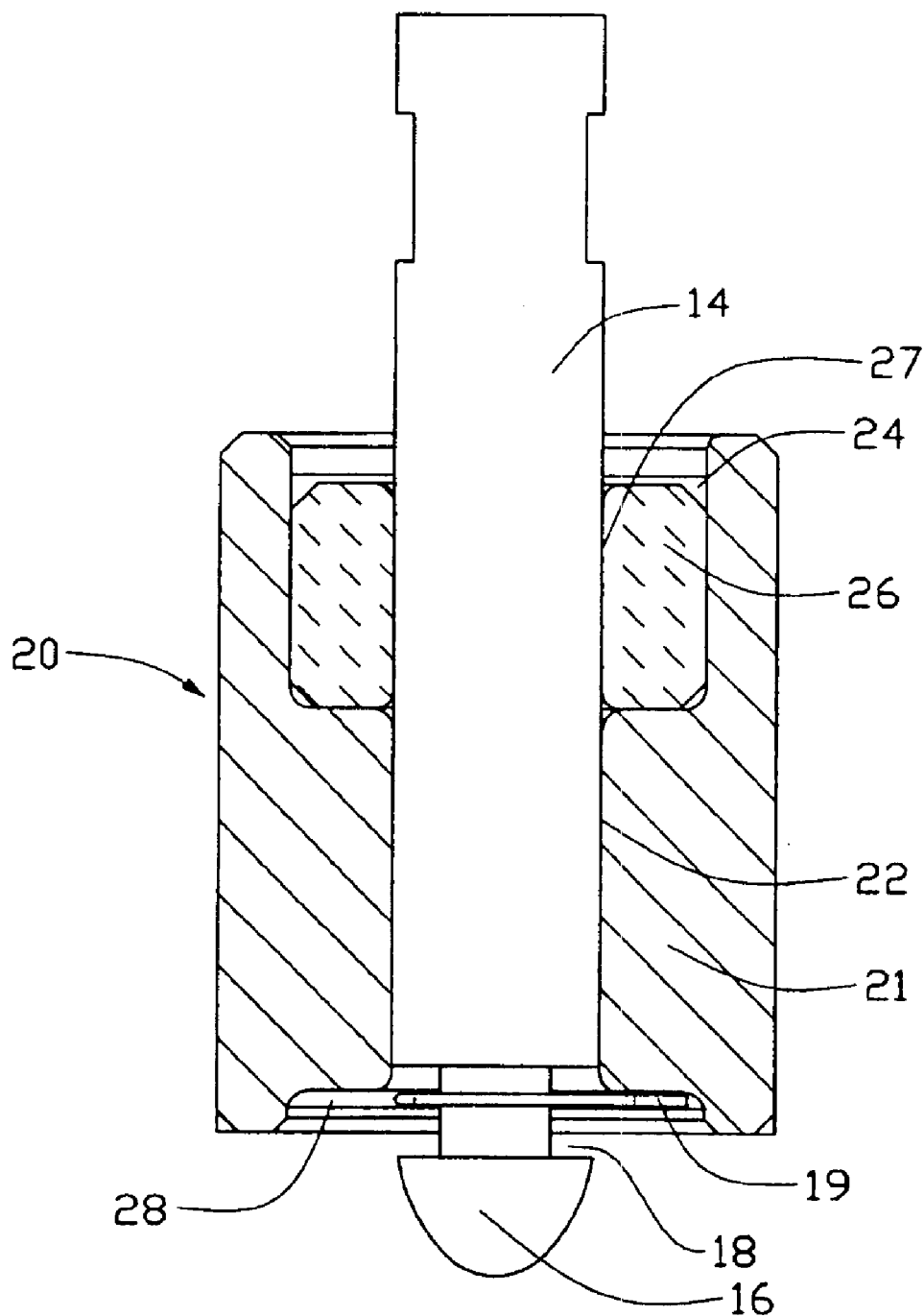
FIG. 3 is a side plan partially cross-sectional view of the bearing device of FIG. 2 fully assembled.
Figure 4:
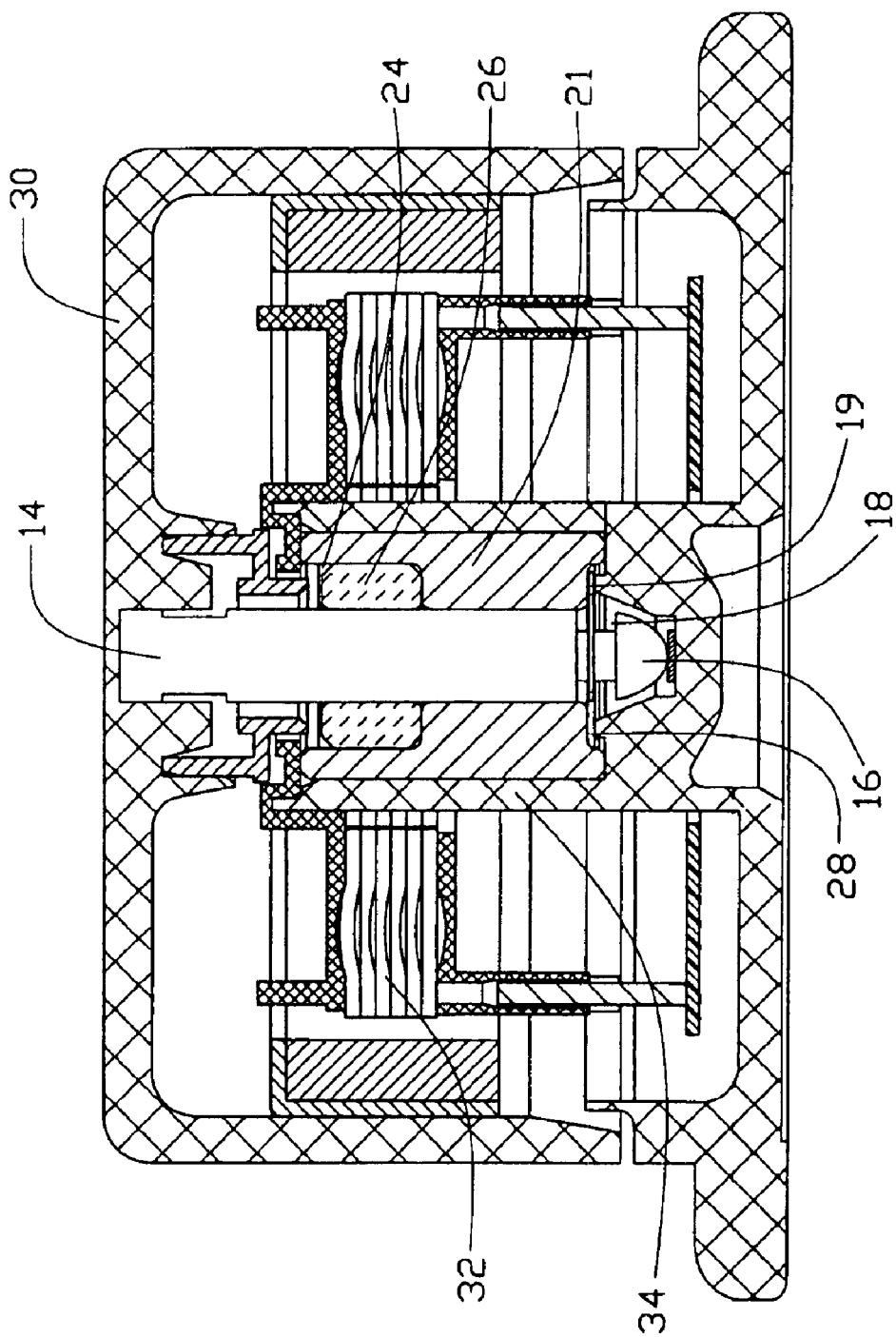
FIG. 4 is an enlarged side plan partially cross-sectional view of the motor of FIG. 1 fully assembled.

Referring to FIGS. 1–4, a bearing device 10 in accordance with a first preferred embodiment of the present invention includes a bearing set 20 and a shaft 14. The bearing device 10 is used in a motor 12.

The bearing set 20 comprises a first bearing 21 and a second bearing 26. The first bearing 21 is cylindrical, and is made of sintered metallic material that includes copper and iron. A central hole 22 is defined through the first bearing 21. An annular recess 24 is defined in one end of the first bearing 21. The recess 24 surrounds and communicates with the hole 22. An annular notch 28 is defined in an opposite end of the first bearing 21. The notch 28 surrounds and communicates with the hole 22. The second bearing 26 is cylindrical, and is made of ceramic material that includes aluminum oxide, zirconium oxide and silicon nitride. A central hole 27 is defined through the second bearing 26. The second bearing 26 is received in the recess 24 of the first bearing 21. The central holes 22, 27 of the first and second bearings 21, 26 have a same diameter.

The shaft 14 is made of ceramic material. A generally hemispherical guiding head 16 is formed at one end of the shaft 14. An annular groove 18 is defined in the shaft 14 adjacent an inner extremity of the guiding head 16, for accommodating a locking fastener 19.

The motor 12 comprises a rotor 30, a stator 32, and a bearing sleeve 34.

In assembly, one end of the shaft 14 distal from the guiding head 16 is fixed in a center of the rotor 30. The locking fastener 19 is placed in the notch 28 of the first bearing 21. The second bearing 26 is inserted into the recess 24 of the first bearing 21. The bearing set 20 is fixed within the bearing sleeve 34. The stator 32 is fixed around the bearing sleeve 34. The shaft 14 is inserted through the central holes 22, 27 of the bearings 21, 26. The guiding head 16 of the shaft 14 enters the locking fastener 19 until the locking fastener 19 is snappingly received in the groove 18 of the shaft 14. The locking fastener 19 prevents the rotor 30 and the shaft 14 from coming out of the bearing set 20 during operation of the motor 12. During such operation, the shaft 14 rotates smoothly and stably in the bearing set 20. Because the first bearing 21 is made of sintered metallic material and the second bearing 26 is made of ceramic material, the bearing device 10 is self-lubricating, extremely durable and quiet.

In an alternative embodiment, the materials of the first and second bearings 21, 26 may be interchanged. That is, the first bearing 21 may be made of ceramic material, and the second bearing 26 may be made of sintered metallic material. The bearing device 10 would then attain the same or similar benefits enjoyed by the bearing device 10 of the first preferred embodiment.

Figure 5:
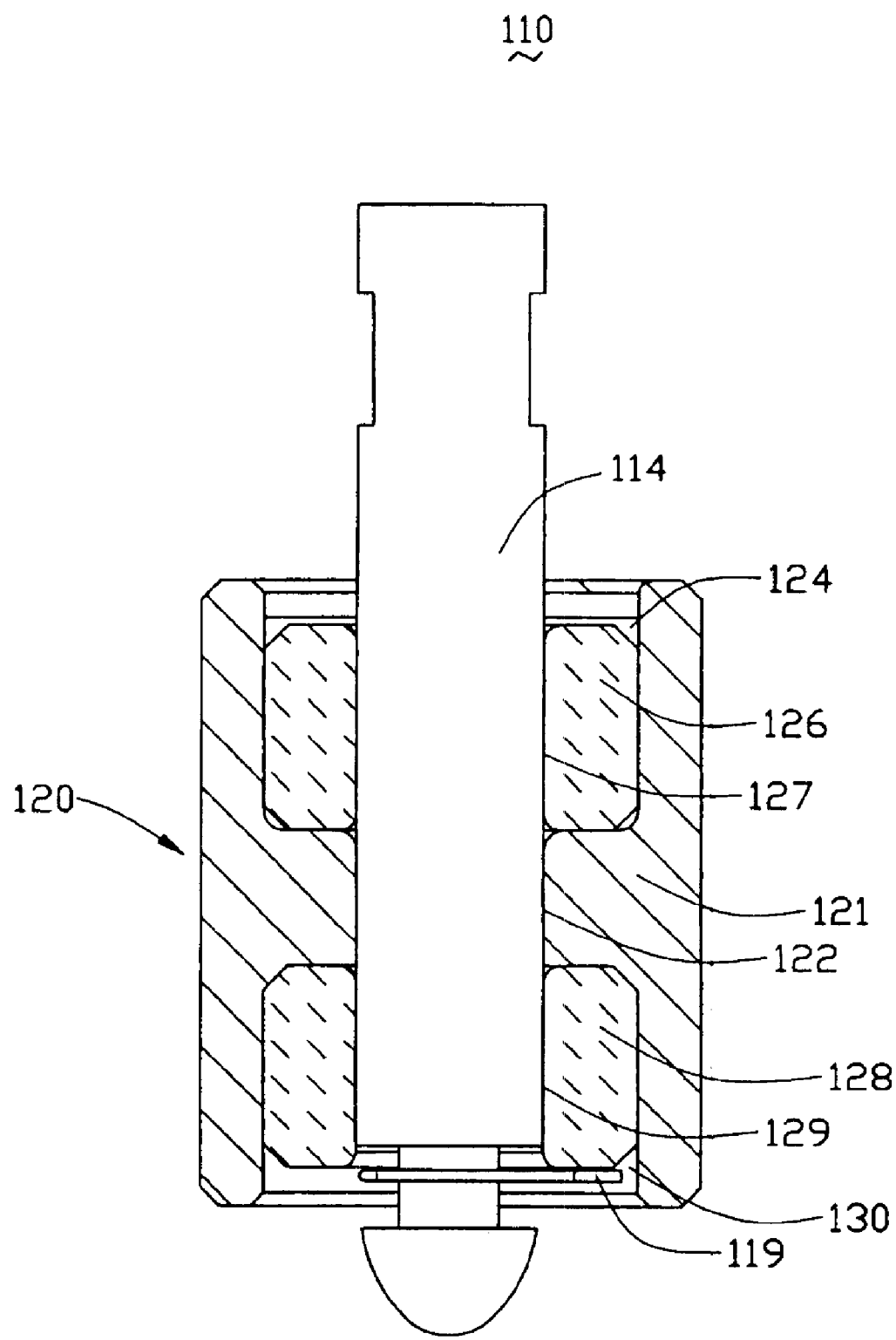
FIG. 5 is a side plan partially cross-sectional view of a fully assembled bearing device in accordance with a second preferred embodiment of the present invention.

Referring to FIG. 5, a bearing device 110 in accordance with a second preferred embodiment of the present invention includes a bearing set 120 and a shaft 114.

The shaft 114 is substantially the same as the shaft 14 of the first preferred embodiment. One end of the shaft 114 snappingly receives a locking fastener 119. The locking fastener 119 is substantially the same as the locking fastener 19 of the first preferred embodiment.

The bearing set 120 comprises a first bearing 121, a second bearing 126, and a third bearing 128. The first bearing 121 is cylindrical, and is made of sintered metallic material. A central hole 122 is defined through the first bearing 121. Two annular recesses 124, 130 are defined in respective opposite ends of the first bearing 121. The recesses 124, 130 respectively surround and communicate with the hole 122. The second and third bearings 126, 128 each are cylindrical, and are made of ceramic material. Central holes 127, 129 are respectively defined through the second and third bearings 126, 128. The second and third bearings 126, 128 are received in the recesses 124, 130 respectively. The central holes 122, 127, 129 of the first, second and third bearings 121, 126, 128 all have a same diameter.

The bearing device 110 is used in a motor (not shown). Other components of the motor are substantially the same as corresponding components of the motor 12 of the first preferred embodiment. Assembly of the bearing device 110 and the motor is similar to the assembly described above in relation to the bearing device 10 of the first preferred embodiment, with due alteration of details.

In an alternative embodiment, the materials of the first bearing 121 and of the second and third bearings 126, 128 may be interchanged. That is, the first bearing 121 may be made of ceramic material, and the second and third bearings 126, 128 may be made of sintered metallic material. The bearing device 110 would then attain the same or similar benefits enjoyed by the bearing device 110 of the second preferred embodiment.

Figure 6:
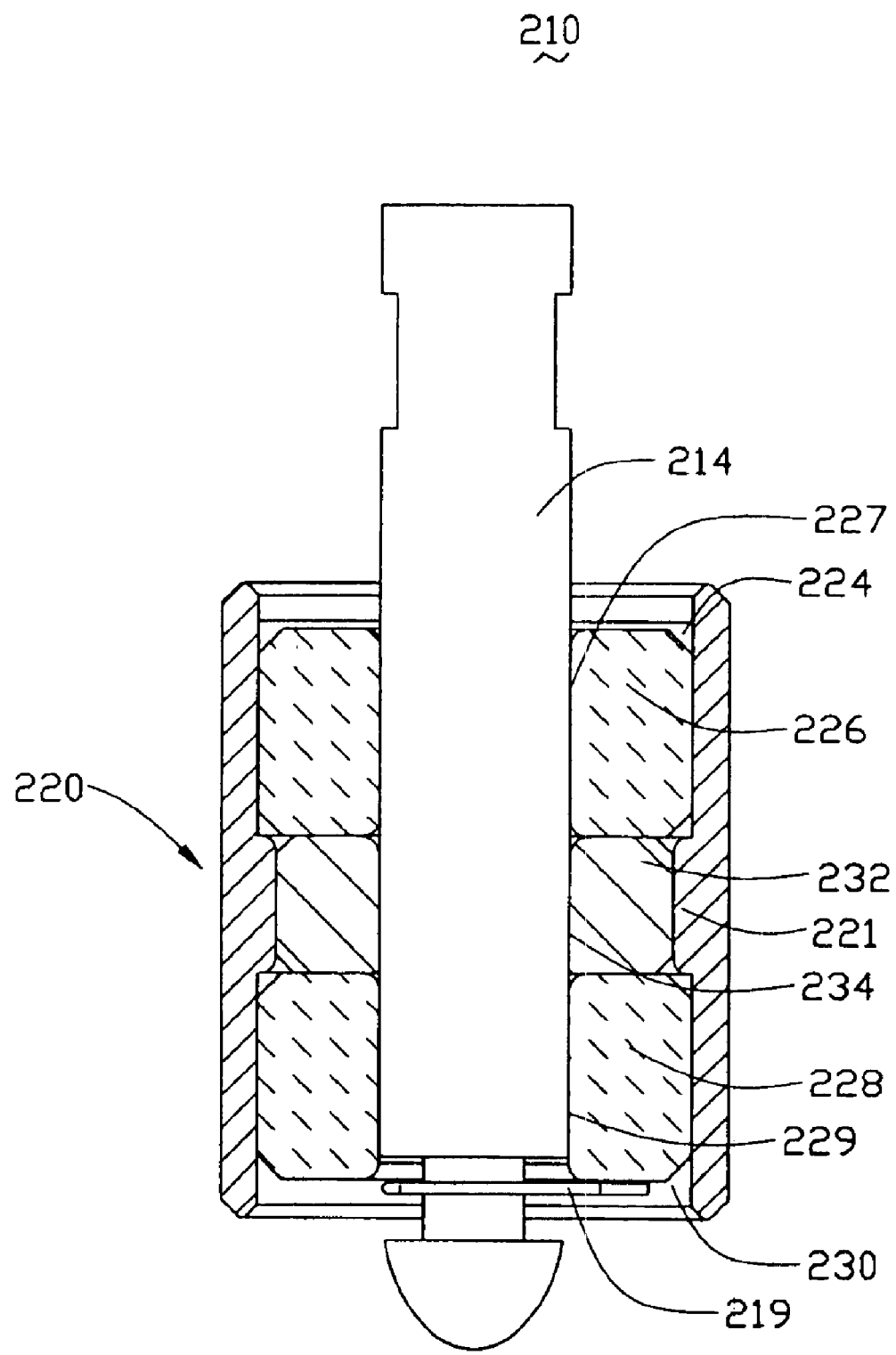
FIG. 6 is a side plan partially cross-sectional view of a fully assembled bearing device in accordance with a third preferred embodiment of the present invention.
Figure 7:
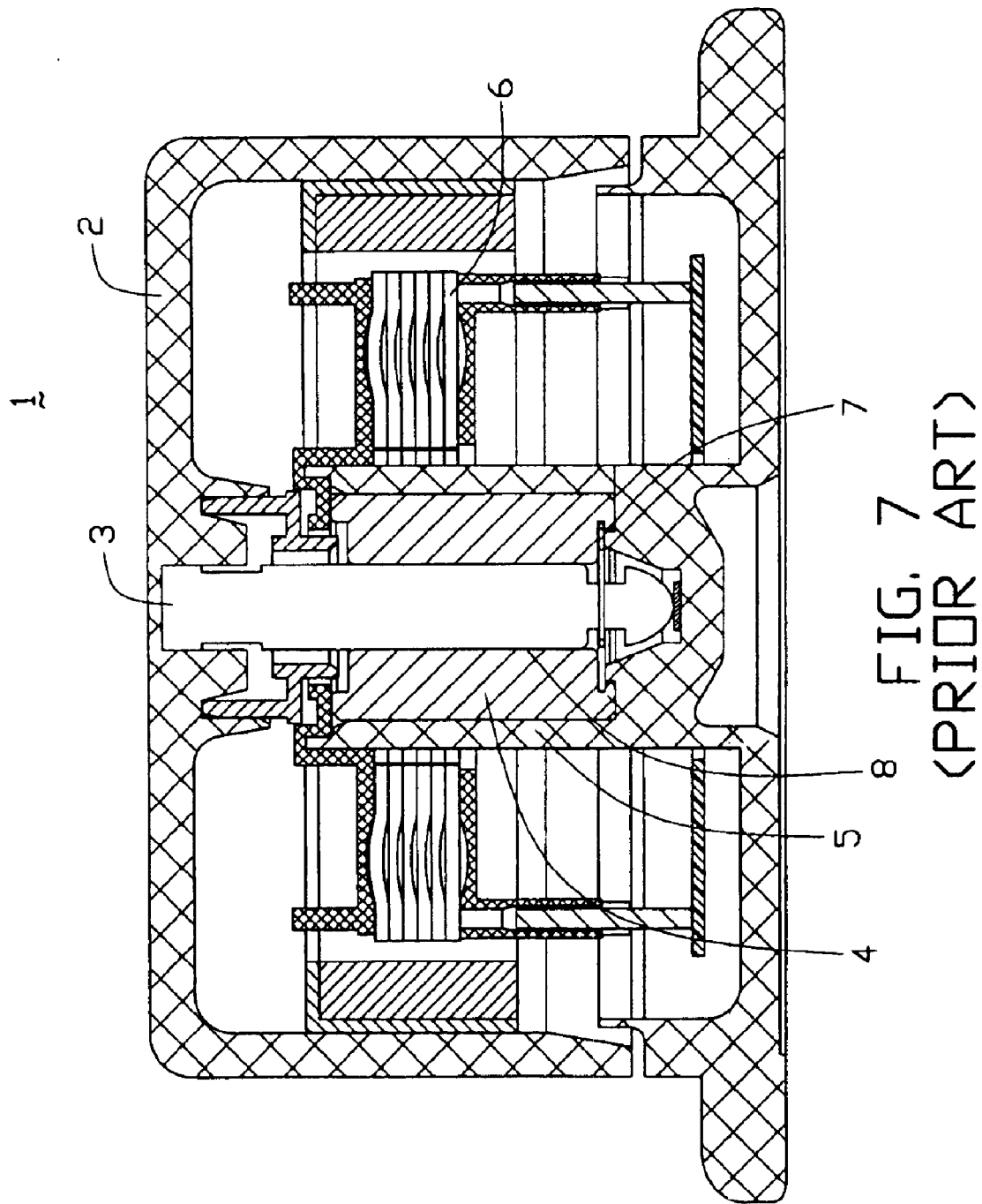
FIG. 7 is a side plan partially cross-sectional view of a conventional motor.

Referring to FIG. 6, a bearing device 210 in accordance with a third preferred embodiment of the present invention includes a bearing set 220 and a shaft 214.

The shaft 214 is substantially the same as the shaft 14 of the first preferred embodiment. One end of the shaft 214 snappingly receives a locking fastener 219. The locking fastener 219 is substantially the same as the locking fastener 19 of the first preferred embodiment.

The bearing set 220 comprises a cylindrical bearing case 221, a first bearing 232, a second bearing 226, and a third bearing 228. The bearing case 221 defines an annular recess 224 at one end thereof that accommodates the second bearing 226. The bearing case 221 further defines an annular recess 230 at an opposite end thereof that accommodates the third bearing 228. The first bearing 232 is cylindrical, and is made of sintered metallic material. A central hole 234 is defined through the first bearing 232. The second and third bearings 226, 228 each are cylindrical, and are made of ceramic material. Central holes 227, 229 are respectively defined through the second and third bearings 226, 228. The first bearing 232 is accommodated in the bearing case 221 between the second and third bearings 226, 228. The central holes 234, 227, 229 of the first, second and third bearings 232, 226, 228 all have a same diameter.

The bearing device 210 is used in a motor (not shown). Other components of the motor are substantially the same as corresponding components of the motor 12 of the first preferred embodiment. Assembly of the bearing device 210 and the motor is similar to the assembly described above in relation to the bearing device 10 of the first preferred embodiment, with due alteration of details.

In an alternative embodiment, the materials of the first bearing 232 and of the second and third bearings 226, 228 may be interchanged. This is, the first bearing 232 may be made of ceramic material, and the second and third bearings 226, 228 may be made of sintered metallic material. The bearing device 210 would then attain the same or similar benefits enjoyed by the bearing device 210 of the third preferred embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bearing device for a motor, the bearing device comprising:

a bearing set including a first bearing and a second bearing, a material of the first bearing being different from a material of the second bearing; and a shaft being rotatably received in the bearing set with the first and second bearings contacting the shaft along an axial direction thereof, wherein the bearing set further includes a third bearing, wherein the bearing device further comprises a bearing case, and the first, second and third bearings are received in the bearing case, and wherein two annular recesses are defined in respective opposite ends of the bearing case, the first, second and third bearings each are cylindrical, the first, second and third bearings each define a central hole, the central holes have substantially the same diameter, the recesses respectively receive the second and third bearings, the first bearing is received in the bearing case between the second and third bearings, and the shaft is rotatably received in the central holes.

2. The bearing device as claimed in claim 1, wherein the first bearing is made of sintered metallic material, and the second and third bearings are made of ceramic material.

3. The bearing device as claimed in claim 2, wherein the first bearing is made of ceramic material, and the second and third bearings are made of sintered metallic material.

4. A motor comprising:

a bearing sleeve;

a stator being fixed around the bearing sleeve;

a rotor pivotably surrounding the stator; and a bearing device comprising a shaft and a bearing set, the bearing set being received in the bearing sleeve, the bearing set including a first bearing and a second bearing, a material of the first bearing being different from a material of the second bearing, one end of the shaft being fixed in the rotor, and an opposite end of the shaft being rotatably received in the bearing set and substantially being touchably enclosed by the bearings in the bearing set, wherein the bearing device further includes a bearing case, the bearing set further includes a third bearing, the first, second and third bearings each are cylindrical, the first, second and third bearings each define a central hole, the central holes have substantially the same diameter, two recesses are defined in respective opposite ends of the bearing case, the second and third bearings are received in the recesses respectively, the first bearing is received in the bearing case between the second and third bearings, and the shaft is rotatably received in the central holes.

5. The motor as claimed in claim 4, wherein at least one of the first, second and third bearings is made of sintered metallic material, and at least one other of the first, second and third bearings is made of ceramic material.

* * * * *